F. L. STEWART.
Foot-Warmer.
No. 196,497. Patented Oct. 23, 1877.
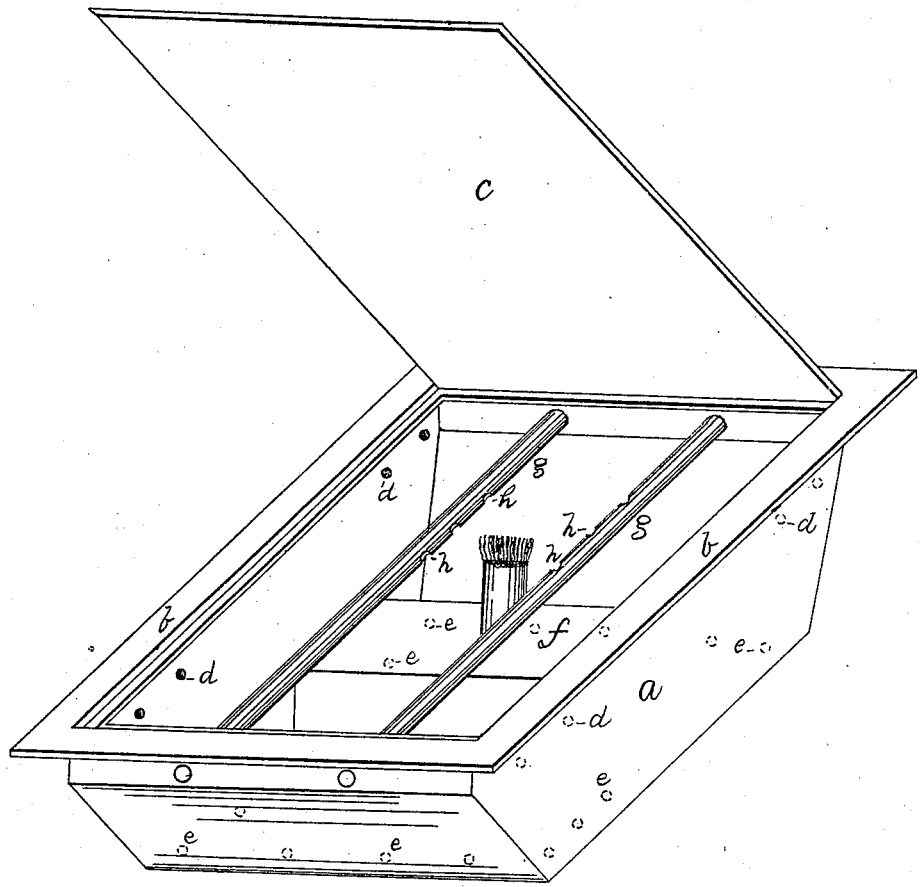
Witness
John R. Mason
George T. Stodder
Inventor
Frank L. Stewart
By Franklin Searcy Atty

UNITED STATES PATENT OFFICE.

FRANK L. STEWART, OF CHARLESTON, MAINE, ASSIGNOR OF ONE-HALF HIS RIGHT TO JAMES FOSS, OF SAME PLACE.

IMPROVEMENT IN FOOT-WARMERS.

Specification forming part of Letters Patent No. 196,497, dated October 23, 1877; application filed August 27, 1877.

*To all whom it may concern:*

Be it known that I, FRANK L. STEWART, of Charleston, in the county of Penobscot and State of Maine, have invented certain new and useful Improvements in Foot-Warmers; and I do hereby declare that the following is a full, clear, and exact description thereof, that will enable others skilled in the art to which it appertains to make and use the same, reference being had to the accompanying drawing, forming a part of this specification, in which is shown a perspective of my invention.

My invention consists of an improved foot-warmer particularly intended for use in sleighs or carriages. The heat is generated by means of a lamp, and the whole device is inserted in the bottom of the vehicle, its top being flush therewith, and receiving the necessary air to feed the flame from openings in the casing below the level of the floor.

My device will be readily understood by reference to the accompanying drawing.

At $a$ is the warmer, furnished with a flange, $b$, around its upper edge, by which it is supported in an opening cut in the floor of the sleigh or carriage. At $c$ is a cover, shutting air-tight to exclude unpleasant odor, and around the sides and through the bottom are openings $d\,e$, properly screened, if necessary, to prevent a direct draft upon the flame. At $f$ is the lamp for generating the heat. At $g\,g$ are tubes extending on each side of the lamp at a level with the top of the flame. These tubes open outside of the casing, below the vehicle-bottom, and are provided with holes $h$ near the lamp-flame, thus securing a draft through to carry off the products of combustion.

It is needless to remark that such parts, at least, of the warmer as are exposed to heat should be made of metal or incombustible material.

What I claim as my invention, and desire to secure by Letters Patent, is—

The improved foot-warmer for vehicles, consisting of the casing $a$, provided with flange $b$, tubes $g\,g$, having openings $h\,h$ therein, lamp $f$, and air-tight cover $c$, substantially as and for the purposes specified.

In testimony that I claim the foregoing I have hereunto set my hand this 23d day of August, 1877.

FRANK L. STEWART.

Witnesses:
JAMES FOSS,
WM. FRANKLIN SEAVEY.